UNITED STATES PATENT OFFICE.

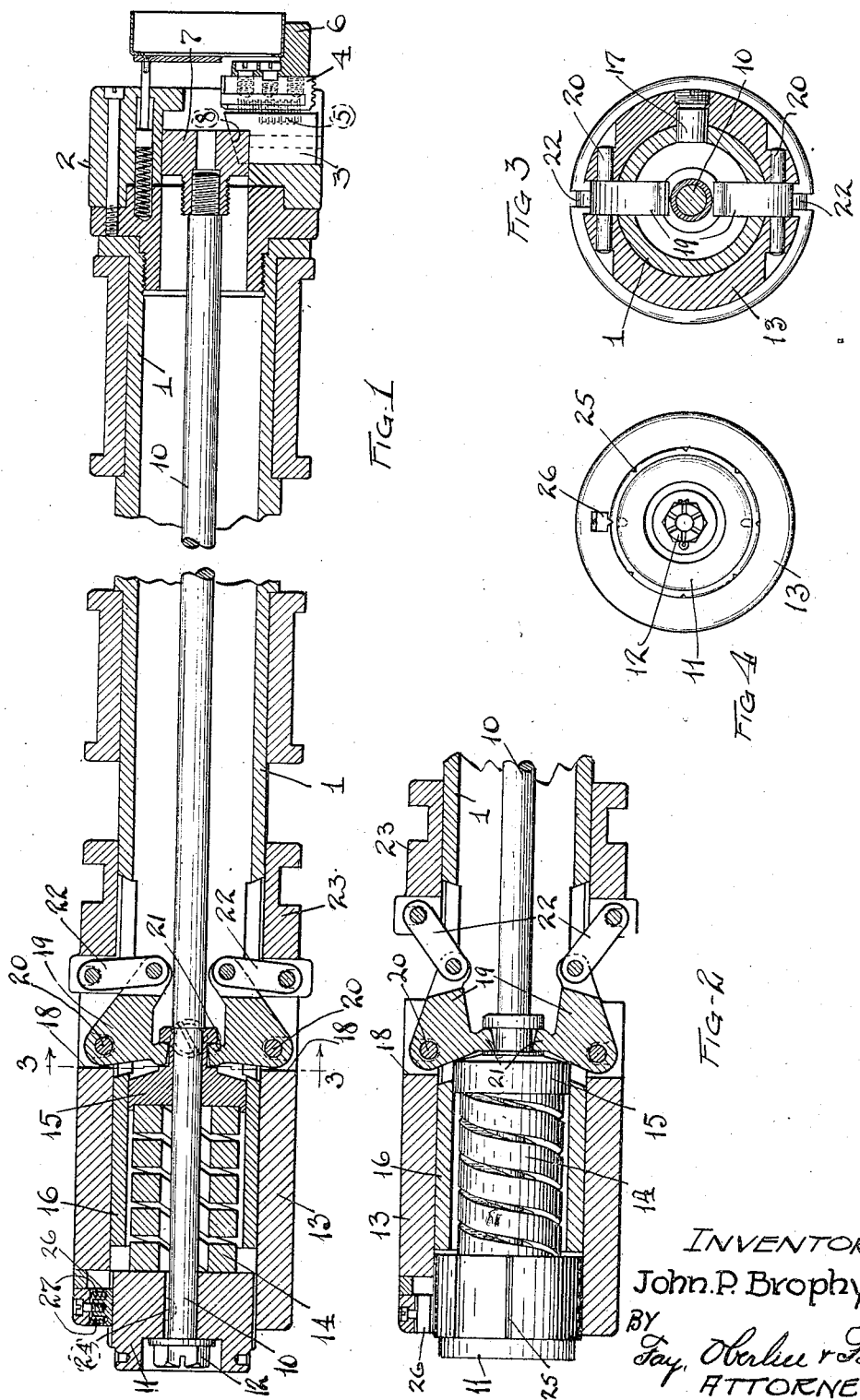

JOHN P. BROPHY, OF CLEVELAND, OHIO.

CHUCK-OPERATING MECHANISM.

1,261,757. Specification of Letters Patent. Patented Apr. 9, 1918.

Application filed November 4, 1916. Serial No. 129,494.

*To all whom it may concern:*

Be it known that I, JOHN P. BROPHY, a citizen of the United States, and a resident of Cleveland, county of Cuyahoga, and State of Ohio, have invented a new and useful Improvement in Chuck-Operating Mechanism, of which the following is a specification, the principle of the invention being herein explained and the best mode in which I have contemplated applying that principle so as to distinguish it from other inventions.

The present improvements, relating as indicated to chuck operating means have more particular regard to a mechanism for operating a chuck of either the internal expanding or external contracting type, in which a plurality of radially movable jaws are actuated by means of a cam or tapered member moved at right angles to the plane of the jaws. One of the objects of the invention is to provide such a mechanism, which is extremely simple in construction and will permit of convenient and quick adjustment, and will also provide means for absorbing in the chuck actuating mechanism any irregularity in the size of the article to be gripped. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a longitudinal section taken through a spindle to which is applied a chuck to be operated as well as my improved means for operating the same; Fig. 2 is a vertical section on the same plane as Fig. 1, but showing the actuating means for the mechanism in operative position, that is, in the open position of the chuck; Fig. 3 is a transverse section on the line 3—3, Fig. 1; and Fig. 4 is a view of the device of Fig. 1 looking from the left.

In Fig. 1 there is shown a live spindle 1 which may be rotated in any suitable manner and which is merely shown as being illustrative of the method of mounting the mechanism forming the subject matter of the present invention. At one end of this spindle 1 there is mounted a chuck head 2, in which are mounted radially movable slides 3 to which are attached jaw receiving members 4. These members 4 are movable radially with respect to the slides 3 by means of screws 5 and can thus be adjusted irrespective of the slides 3 and without any movement on the part of the latter. On the face of the members 4 are formed fingers or jaws 6 which engage directly against any article to be held, which in the present instance is shown as a section of a tubular member, but which may of course be any article that it may be desirable to machine. The members are actuated radially by means of a cam 7 provided with tapered slots or grooves 8, which engage the inner tapered ends of the guides 3 and it will be evident that movement of the guides 3 is secured by longitudinal movement of the cam 7. Adjustably secured in the rear side of this cam 7 is a chuck actuating rod or bar 10, which extends centrally through the spindle 1 to the rear end of the same.

The present invention has particular regard to the means for operating the rod 10 and for adjusting the same with respect to the cam 7. Slidably, but non-rotatably mounted on the end of the rod 10 is a collar 11 which is held in position by means of a nut 12 engaged on the end of the rod 10. Mounted in a member 13, which is a sleeve fitting tightly over the rear end of live spindle 1 and which is locked to same by dowel pins 17 (Fig. 3), is a coiled spring 14 which is disposed about the operating rod 10 with one end in contact with the inner face of the collar 11 and with its other end in contact with a collar 15. This collar 15 is mounted upon the rod 10 and rests against a shoulder on rod 10 and is provided with a recess in one face for receiving the end of the spring 14. Both the sleeve 13 and the live spindle 1 are cut away to form openings 18, through which there extend levers 19, which are pivoted upon pins 20 mounted in the sleeve 13 and engaged at their inner ends in an annular recess or groove formed in the end of the collar 15. Attached to the outer ends of the levers 19 are links 22 which are pivoted at their other ends to a slidable collar 23 mounted upon the spindle 1 and actuated in any suitable manner to move longitudinally of this spindle, such actuation being preferably secured by means of cams (not shown).

When the mechanism is assembled the coil spring 14 is placed under very heavy compression between the collar 15 which rests against a shoulder on rod 10 and the block 11, which in turn rests against the washer and nut 12. The chuck is shown in closed position in Fig. 1 when the links 22 are approximately vertical in their position, and to open the chuck it is necessary to move the rod 10 to the right, which is accomplished by moving the collar 23 in the same direction and thus moving the levers 19 and the collar 15 into the position shown in Fig. 2.

The spring 14 is of sufficient strength and when assembled is placed under sufficient compression to make it possible for this member to act as an intermediate connection between the collar 15 and the block 11 and rod 10. Thus if the collar 15 is moved to the left this movement is not taken up, under normal operating conditions, by the further compression of the spring 14, but the movement of this shifting collar is transmitted directly and completely to the rod 10 and thus to the chuck. If, however, the article to be gripped varies slightly from the standard size, this variation will cause a greater amount of resistance than normal to the operation of the chuck and under this excessive resistance the spring 14 will be compressed to some extent by the movement of the shifting collar to close the chuck. In this way the operating mechanism is made to compensate for slight irregularities in the size of the article being operated upon.

There is an adjustment provided in the present mechanism for controlling the strength of the grip of the chuck jaws 6 upon the piece being held in the chuck. This adjustment is made by turning the collar 11 in either direction by means of a spanner wrench, this movement being transmitted to rod 10 by means of the key 24, which thus rotates the rod 10 and screws the same into or out of the cam 7, which will of course vary the operation of the chuck. The periphery of the collar 11 is provided with a series of notches 25 which are successively engaged by means of a plunger 26 normally pressed downward by means of a spring 27, and this plunger serves as a latch to maintain the block 11 from accidental rotation, which would of course cause a variation in the operation of the chuck.

I have not described the mechanism of the chuck in detail since obviously the present invention may be readily applied to various chucks without essential modification. In addition to this use of the invention others will readily suggest themselves to those familiar with machinery of various types.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a chuck having movable engaging jaws and a longitudinally movable actuating cam therefor; an actuating rod having an adjustable threaded engagement with said cam; and a stop mounted non-rotatably on said rod, whereby rotation of said stop rotates said rod and adjusts the same with respect to said cam.

2. The combination of a chuck having movable engaging jaws and a longitudinally movable actuating cam therefor; an actuating rod having an adjustable threaded engagement with said cam; a stop mounted non-rotatably on said rod, whereby rotation of said stop rotates said rod and adjusts the same with respect to said cam; and means adapted to actuate said rod by pressure against said stop.

3. The combination of a chuck having movable engaging jaws, an actuating cam therefor, an actuating rod having adjustable threaded engagement with said cam, a stop fixed on said rod, a collar slidable on said rod, but adapted to engage the same upon movement in one direction, and resilient means disposed between said stop and said collar and serving as a connection between said collar and said rod for movement in one direction.

4. The combination of a chuck having movable engaging jaws, an actuating cam therefor, an actuating rod having adjustable threaded engagement with said cam, a stop fixed on said rod, a collar slidable on said rod, but adapted to engage the same upon movement in one direction, and resilient means disposed between said stop and said collar and serving as a connection between said collar and said rod for movement in one direction, and resilient latch means tending to prevent relative rotation between said rod and said cam.

5. The combination of a chuck having movable engaging jaws, an actuating cam therefor, an actuating rod having adjustable threaded engagement with said cam, a stop fixed on said rod, a collar slidable on said rod, but adapted to engage the same upon movement in one direction, and resilient means disposed between said stop and said collar and serving as a connection between said collar and said rod for movement in one direction, and resilient latch means operating on said stop and tending to prevent relative rotation between said rod and said cam.

6. The combination of a chuck having radially movable jaws and a longitudinally movable actuating cam therefor, of an actuating rod having an adjustable threaded engagement with said cam; a stop mounted non-rotatably on said rod, whereby rotation of said stop rotates said rod and adjusts the same with respect to said cam; and means adapted to actuate said rod by pressure against said stop.

7. The combination of a chuck having radially movable jaws and a longitudinally movable actuating cam therefor; of an actuating rod having an adjustable threaded engagement with said cam; a stop mounted non-rotatably on said rod, whereby rotation of said stop rotates said rod and adjusts the same with respect to said cam; and means adapted to actuate said rod by pressure against said stop, said means including other means adapted to compensate for irregularities in the article to be engaged by said chuck.

8. The combination of a chuck having radially movable jaws and a longitudinally movable actuating cam therefor; of an actuating rod having an adjustable threaded engagement with said cam; a stop mounted non-rotatably on said rod, whereby rotation of said stop rotates said rod and adjusts the same with respect to said cam; and means adapted to actuate said rod by pressure against said stop, said means including a spring disposed about said rod and bearing against said stop and toggle mechanism acting against the other end of said rod and adapted to operate said rod through said spring.

9. The combination of a chuck having radially movable jaws and a longitudinally movable actuating cam therefor; of an actuating rod having an adjustable threaded engagement with said cam; a stop mounted non-rotatably on said rod, whereby rotation of said stop rotates said rod and adjusts the same with respect to said cam; and means adapted to actuate said rod by pressure against said stop, said means including a spring disposed about said rod and bearing against said stop and toggle mechanism acting against the other end of said rod and adapted to operate said rod through said spring, and means adapted to vary the position of said stop on said rod.

Signed by me, this 3rd day of November, 1916.

JOHN P. BROPHY.

Copies of this patent may be obtained for five cents each, by addressing the "Commissioner of Patents, Washington, D. C."